(12) United States Patent
Gupta et al.

(10) Patent No.: US 12,547,722 B2
(45) Date of Patent: Feb. 10, 2026

(54) FIRMWARE BINARY SCANNING FOR PROGRAMMABLE DEVICES

(71) Applicant: American Megatrends International, LLC, Duluth, GA (US)

(72) Inventors: Chitrak Gupta, Johns Creek, GA (US); Venkatesan Balakrishnan, Chennai (IN)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 58 days.

(21) Appl. No.: 18/658,005

(22) Filed: May 8, 2024

(65) Prior Publication Data

US 2025/0348586 A1  Nov. 13, 2025

(51) Int. Cl.
*G06F 21/57* (2013.01)
*G06F 21/56* (2013.01)

(52) U.S. Cl.
CPC ............ *G06F 21/57* (2013.01); *G06F 21/563* (2013.01)

(58) Field of Classification Search
CPC ....... G06F 21/57; G06F 21/563; G06F 21/572
See application file for complete search history.

(56) References Cited

U.S. PATENT DOCUMENTS

| | | | |
|---|---|---|---|
| 8,219,983 B1* | 7/2012 | Sobel | G06F 8/60 717/126 |
| 11,531,760 B1* | 12/2022 | Righi | G06F 21/85 |
| 12,001,560 B2* | 6/2024 | Wen | H04L 9/3247 |
| 2005/0228888 A1* | 10/2005 | Mihm | G06F 8/65 709/227 |
| 2009/0193150 A1* | 7/2009 | Graves | G06F 3/0689 710/3 |
| 2011/0113177 A1* | 5/2011 | Yu | G06F 8/65 710/301 |
| 2013/0290947 A1* | 10/2013 | Li | G06F 8/65 717/171 |
| 2017/0134373 A1* | 5/2017 | Li | G06F 21/85 |
| 2018/0165455 A1* | 6/2018 | Liguori | G06F 21/57 |
| 2018/0322285 A1* | 11/2018 | Olarig | G06F 21/564 |
| 2019/0173749 A1* | 6/2019 | Thomas | G06F 9/451 |
| 2019/0236271 A1* | 8/2019 | Shivanna | H04L 9/0863 |
| 2020/0034541 A1* | 1/2020 | Ballard | G06F 8/654 |
| 2020/0074086 A1* | 3/2020 | Bulygin | G06F 21/572 |
| 2020/0218527 A1* | 7/2020 | Ganesan | G06F 8/65 |
| 2023/0342469 A1* | 10/2023 | Terpstra | G06F 21/57 |
| 2024/0104211 A1* | 3/2024 | Kaiser | G06F 11/267 |
| 2024/0354391 A1* | 10/2024 | Veluthakkal | H04L 9/0891 |

* cited by examiner

Primary Examiner — Javier O Guzman
(74) Attorney, Agent, or Firm — TROUTMAN PEPPER LOCKE LLP; Tim Tingkang Xia, ESQ.

(57) ABSTRACT

A BMC determines that a binary image for a device of a host computer is to be updated. The BMC scans the binary image for malicious code using a binary scanning application. The BMC prevents updating the device with the binary image in response to detecting malicious code in the binary image during the scanning.

17 Claims, 6 Drawing Sheets

FIRMWARE BINARY SCANNING FOR PROGRAMMABLE DEVICES

BACKGROUND

Field

The present disclosure relates generally to computer systems, and more particularly, to techniques of scanning binary images for malicious code before updating devices of a host computer system.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is a BMC. The BMC determines that a binary image for a device of a host computer is to be updated. The BMC scans the binary image for malicious code using a binary scanning application. The BMC prevents updating the device with the binary image in response to detecting malicious code in the binary image during the scanning.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
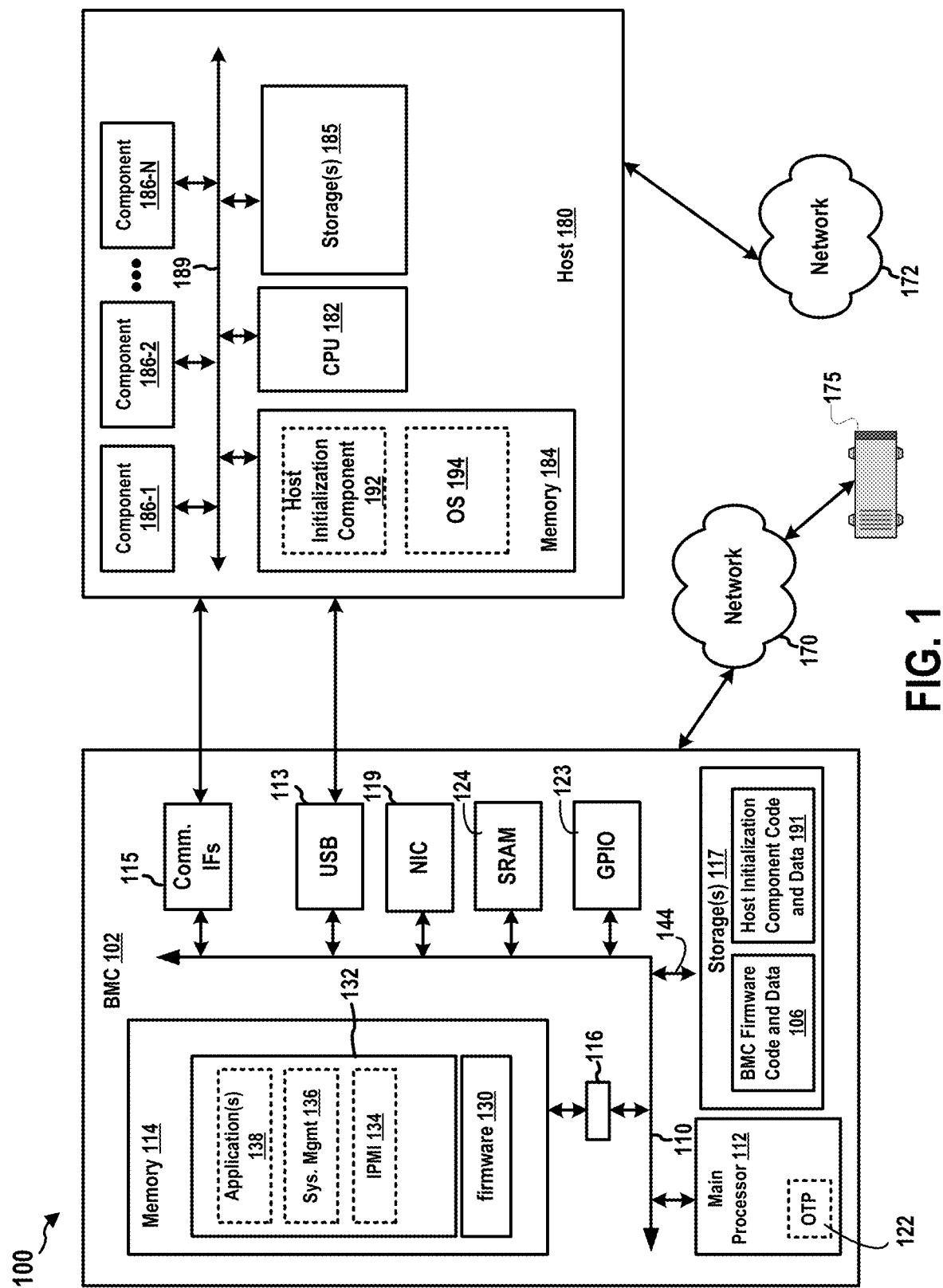
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a baseboard management controller (BMC) 102 and a host computer 180. The BMC 102 has, among other components, a main processor 112, a memory 114 (e.g., a dynamic random access memory (DRAM)), a memory driver 116, storage(s) 117, a network interface card 119, a USB interface 113 (i.e., Universal Serial Bus), other communication interfaces 115, a SRAM 124 (i.e., static RAM), and a GPIO interface 123 (i.e., general purpose input/output interface). Further, the main processing unit 112 contains an OTP memory 122 (i.e., one time programmable memory).

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the main processor 112, the memory 114, the memory driver 116, the storage(s) 117, the network interface card 119, the USB interface 113, and/or the communication interfaces 115 may be on the same chip. In addition, the memory 114, the main processor 112, the memory driver 116, the storage(s) 117, the communication interfaces 115, and/or the network interface card 119 may be in communication with each other through a communication channel 110 such as a bus architecture.

The BMC 102 may store BMC firmware code and data 106 in the storage(s) 117. The storage(s) 117 may utilize one or more non-volatile, non-transitory storage media. During a boot-up, the main processor 112 loads the BMC firmware code and data 106 into the memory 114. In particular, the BMC firmware code and data 106 can provide in the memory 114 a BMC OS 130 (i.e., operating system) and service components 132. The service components 132 include, among other components, IPMI services 134, a system management component 136, and application(s) 138. Further, the service components 132 may be implemented as a service stack. As such, the BMC firmware code and data 106 can provide an embedded system to the BMC 102.

The BMC 102 may be in communication with the host computer 180 through the USB interface 113, the network interface card 119, the communication interfaces 115, and/or the IPMI interface, etc.

The host computer 180 includes a host CPU 182, a host memory 184, storage device(s) 185, and component devices 186-1 to 186-N. The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller.

Further, the storage(s) 117 may store host initialization component code and data 191 for the host computer 180. After the host computer 180 is powered on, the host CPU 182 loads the initialization component code and data 191 from the storage(s) 117 though the communication interfaces 115 and the communication channel 110. The host initialization component code and data 191 contains an initialization component 192. The host CPU 182 executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device(s) 185, usually a hard disk of the storage device(s) 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172 and out-of-band to the host computer 180. In particular, communications of the BMC 102 through the communication network 170 do not pass through the OS 194 of the host computer 180. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Further, the storage(s) 117 is in communication with the communication channel 110 through a communication link 144.

Figure 2:
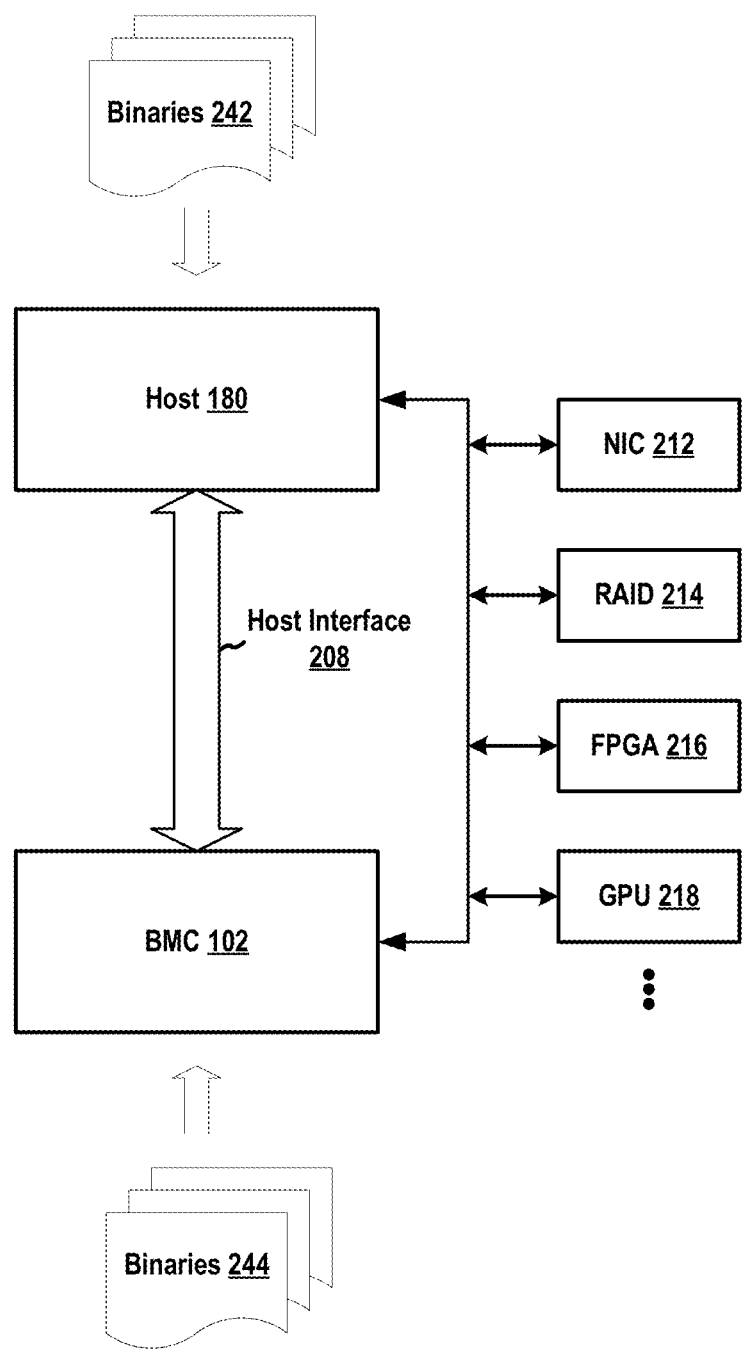
FIG. 2 is a diagram illustrating techniques of updating firmware of devices of a host computer.

FIG. 2 is a diagram 200 illustrating techniques of updating firmware of devices of the host computer 180. In this example, the host computer 180 employs one or more of a NIC 212, a RAID 214, a FPGA 216, and a GPU 218, etc. The host computer 180 is in communication with the BMC 102 through a host interface 208.

Information security is a major focus for data centers, yet security breaches remain ubiquitous in the industry. While operating system-based virus and security scanners provide protection to artifacts in the operating system world, they fail to protect other I/O channels and information processed at different devices, such as accelerators.

For example, the BMC 102 provides access to its memory storage to external agencies for firmware update packages and executable images. However, this access may be unvalidated and can potentially introduce trojans and other malicious code. Firmware flash images can be loaded onto memories of devices of the host computer 180, such as the Network Interface Controller (NIC) 212, the Redundant Array of Independent Disks (RAID) 214, the Field-Programmable Gate Array (FPGA) 216, and the Graphics Processing Unit (GPU) 218, through different channels, and the contents may not be verified.

As the industry moves from single CPU-based applications running on the host computer 180 to a disaggregated world, the devices such as the FPGA 216 and the GPU 218 can take payloads from the external world, which can be run on these devices. FPGAs can host software-defined applications that run continuously, such as routing protocols or call monitoring systems. Many applications can be offloaded from the host operating system to FPGAs and accelerators.

BMCs can act as an installation provider or provisioning system for these devices. For example, in the 5G and telecommunication space, BMCs can act as an installation provider or provisioning system for networking modules that run on FPGAs, etc.

In a first use case, the BMC 102 itself can receive and update executables (e.g., binaries 244) that run on device such as the FPGA 216 or the GPU 218, etc. In a second use case, applications or payloads (e.g., binaries 242) that can be run on the FPGA 216 or the GPU 218 are deployed by the host computer 180. However, even with signatures, malicious code can be embedded into such executables. The firmware is flashed onto devices, and the contents may not be checked. A firmware that runs on the GPU 218 or the NIC 212 can be contaminated.

As described, the BMC 102 may provide an access path for deploying, to the host computer devices, multiple binaries 244, including firmware images for BIOS, Complex Programmable Logic Device (CPLD), NICs, and RAID controllers, FPGAs, GPUs, smart NICs, Infrastructure Processing Units (IPUs), Data Processing Units (DPUs), and other accelerators and devices present in computer systems. The BMC 102 provides a conduit for deploying executable binary images to those devices.

There are potential risks if the firmware images are not verified. Even if certified images are provided through a platform root of trust, which provides a first layer of validity, there is no guarantee that the content of the images is proper. The root of trust verification does not verify the actual content of the image. This is particularly important when there are executable binaries for accelerators like the FPGA 216 that may impact system functionality.

Similarly, binaries 242 can be pushed to devices such as the NIC 212, the RAID 214, the FPGA 216, and the GPU 218 etc. from the host computer 180's operating system, which may be hosted on the server hard drive, remotely booted, or booted through USB drives. There are multiple attack planes and not all may be secured through image signing verification alone.

Even if a firmware provider takes care of image signatures, sources and images are published openly and may be compromised. Further, there is a desire to move towards a zero-trust framework where nothing coming from the network is trusted. Although the platform root of trust provides signature matching for signatures and certificates, a malicious agent could potentially change the content, generate or sign the image with the same signature, and then host it so that it contains malicious code which can compromise the system. This brings the security problems that existed on the host down to FPGAs and accelerators.

In such a scenario, proper image content verification is required to identify potential signatures of threats before the firmware images are flashed onto the devices.

Figure 3:
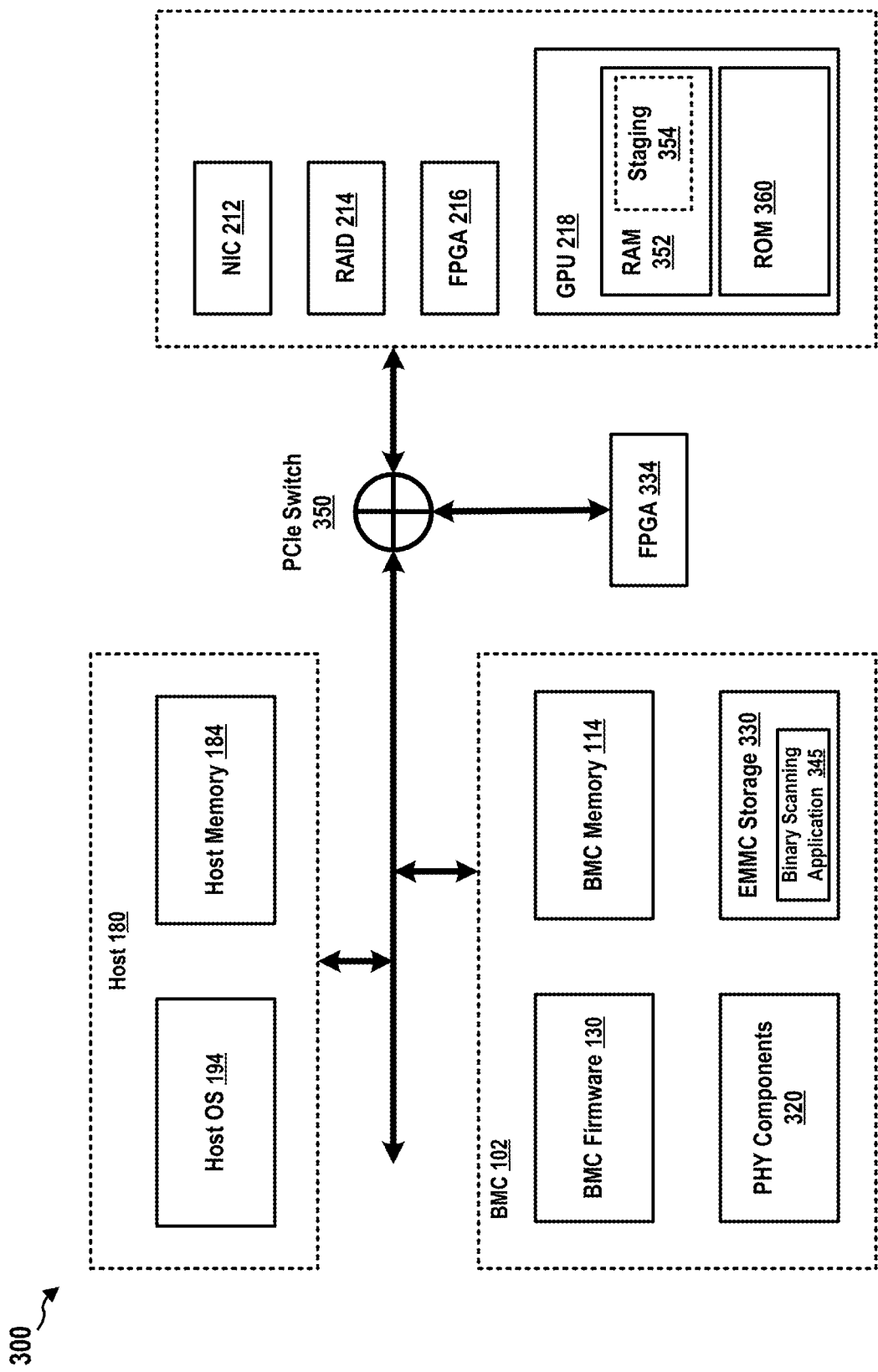
FIG. 3 is a diagram illustrating techniques of scanning firmware for updating devices of the host computer.

FIG. 3 is a diagram 300 illustrating techniques of scanning firmware for updating devices of the host computer 180. In this example, the BMC firmware 130 is executed on the BMC main processor 112, which is part of physical components 320, of the BMC 102. The BMC firmware 130 can access the BMC memory 114 and an EMMC storage 330. The BMC 102 also include an FPGA 334, which is in communication with the BMC firmware 130 through a PCIe link and a PCIe switch 350. Further, the BMC firmware 130 is in communication with devices such as the NIC 212, the RAID 214, the FPGA 216, the GPU 218, etc. of the host computer 180 through PCIs links and the PCIe switch 350.

Further, the host OS 194 is executed on the host CPU 112 and accesses the host memory 184. The host OS 194 is in communication with the devices such as the NIC 212, the RAID 214, the FPGA 216, the GPU 218, etc. through PCIs links and the PCIe switch 350.

Each device may include a RAM and a ROM or other similar memories/storages. The RAM has a staging area, which will be described infra. For example, the GPU 218 has a RAM 352, which includes a staging area 354, and a ROM 360.

The BMC firmware 130 employs a binary scanning application 345, which is similar to scanners that match known malware signatures, to run either in the BMC 102 or in an accelerator such as the FPGA 334 before the binaries 242 or 244 are applied to the intended devices such as the NIC 212, the RAID 214, the FPGA 216, and the GPU 218. The BMC 102 stores the binary scanning application 345 along with the prospective signatures of malware in its on-board EMMC storage 330.

The BMC 102 becomes a controller that checks and verifies the contents of all images (e.g., the binaries 242 and 244), whether they come from the host computer 180 or are channeled through the BMC 102. When the BMC 102 is in control for flashing the devices, the BMC 102 will check all images that pass through it before allowing the images to be flashed or moved to the ultimate devices. More specifically, the BMC firmware 130 will verify the signature of the image.

In a first technique, the BMC firmware 130 pushes an image from the binaries 244 to the intended device memory locations, such as the staging area 354 of the RAM 352 of the GPU 218. The BMC firmware 130 knows the starting memory address and the number of bytes of the image in the staging area 354. The BMC firmware 130 sends the memory location information to the binary scanning application 345. The binary scanning application 345 scans the binary for any signatures that indicate a potential compromise or malicious code. If any such signatures are detected, the BMC firmware 130 will block the update or installation operation and delete the binary image from its repository in the EMMC storage 330. This prevents any compromised or malicious firmware or application from being installed on the devices of the host computer 180.

By scanning the binaries before allowing the flashing operation to proceed, the BMC firmware 130 provides an additional layer of security to protect the integrity of the firmware and applications running on the devices of the host computer 180. This scanning operation may be triggered, for example, whenever there is a Redfish call to the BMC 102 to update a firmware or install a software application on a device of the host computer 180.

In certain configurations, the BMC firmware 130 may load the binary scanning application 345 from the EMMC storage 330 into the BMC memory 114 and instruct the BMC main processor 112 to execute the binary scanning application 345. The binary scanning application 345 has access to the device memory locations through the PCIe switch 350. The binary scanning application 345 scans the binary images staged in the memory of these devices, such as the staging area 354 in the RAM 352 of the GPU 218, for any signatures that indicate a potential compromise or malicious code.

In certain configurations, the BMC main processor 112 may be a less powerful processor, have limited processing capabilities. The BMC 102 can offload the scanning to the FPGA 334 for faster operation. More specifically, the BMC firmware 130 retrieves the binary scanning application 345 from the EMMC storage 330. The BMC firmware 130 transfers the binary scanning application 345 to the FPGA 334 over the PCIe link through the PCIe switch 350. The BMC firmware 130 instructs the FPGA 334 to load the binary scanning application 345 into its internal memory. The FPGA 334 loads the binary scanning application 345 and prepares it for execution. The BMC firmware 130 sends a command to the FPGA 334 to start the execution of the binary scanning application 345.

Once the binary scanning application 345 is loaded and running on the FPGA 334, it can access the memory locations of the devices such as the NIC 212, the RAID 214, the FPGA 216, and the GPU 218 through the PCIe switch 350. This allows the binary scanning application 345 to efficiently scan the binary images staged in the memory of these devices, such as the staging area 354 in the RAM 352 of the GPU 218.

After the scanning process is completed, the binary scanning application 345, running on the BMC main processor 112 or the FPGA 334, notifies the BMC firmware 130 about the scan results, including any detected malicious signatures.

Upon receiving the scan results from the binary scanning application 345, executed on the BMC main processor 112 or the FPGA 334, the BMC firmware 130 can then take appropriate actions based on the scan results, such as blocking the flashing operation if malicious code is found or proceeding with the flashing if the binary image is clean.

When the binary image is clean, the BMC firmware 130 then may send a sideband command to the device, such as the GPU 218, to commence the flashing operation. This involves transferring the binary image from the staging area 354 of the RAM 352 to the ROM 360 of the GPU 218. More specifically, the device, such as the GPU 218, receives the sideband command from the BMC firmware 130. The device then reads the binary image from its staging area 354 in the RAM 352 and writes the binary image to its ROM 360, effectively flashing the binary image and updating its firmware or installing the application. After the binary is successfully transferred to the ROM 360, the BMC firmware 130 may send a command to the device to reset or restart, allowing the new firmware to take effect. As such, the device operates with the updated and verified firmware.

In a second technique, the BMC 102 receives a binary image of the binaries 244. Instead of pushing the image directly to the device memory, such as the RAM 352 or the staging area 354 of the GPU 218, the BMC 102 holds the image in the BMC memory 114 and performs the scan there. More specifically, the BMC firmware 130 stores the image into the BMC memory 114. The BMC firmware 130 then activates the binary scanning application 345, which is loaded from the EMMC storage 330 into the BMC memory 114. The binary scanning application 345 scans the image stored in the BMC memory 114 for any malicious code or signatures.

If the scan is clean and no malicious content is found, the BMC firmware 130 then transfers the verified image from the BMC memory 114 to the intended device, such as the RAM 352 of the GPU 218, through the PCIe switch 350. Once the image is transferred to the device memory, the BMC firmware 130 sends a sideband command to the device to initiate the flashing process, which writes the image from the RAM 352 to the ROM 360 of the GPU 218.

If the binary scanning application 345 detects any malicious code or signatures in the image stored in the BMC memory 114, the BMC firmware 130 deletes the compromised image from the BMC memory 114 and does not transfer it to the device memory. This prevents any compromised or malicious firmware or application from being installed on the devices of the host computer 180.

In a third technique, a binary image from the binaries 242 is pushed from the host OS 194. More specifically, the binary image is pushed to the staging memory, such as the staging area 354 of the RAM 352 of the GPU 218, of the devices. This means that if an image is going to be flashed onto the NIC 212, the GPU 218, or any other device, it will not get flashed immediately. Once the host OS 194 transfers the binary image to the staging area, an event will be triggered from the host OS 194 to the BMC firmware 130 to begin the scanning. The host OS 194 also sends, to the BMC firmware 130, the memory address and size information for where the binary image is located in the staging area 354. Further, the host OS 194 can be a bootable OS booted from a USB or over a networked storage.

Upon receiving the event from the host OS 194, the BMC firmware 130 maps the memory address of the staging area 354, which is accessible via the PCIe switch 350. The BMC firmware 130 then activates the binary scanning application 345, which can run either on the BMC main processor 112 or on the FPGA 334 for faster operation.

In certain configurations, the binary scanning application 345 uses the mapped memory address to access the binary image stored in the staging area 354 of the RAM 352 on the GPU 218. It performs a memory transfer to copy the entire binary image from the staging area 354 into its own memory space, either in the BMC memory 114 if running on the BMC main processor 112, or into memory on the FPGA 334 if offloaded to the FPGA. With the binary image now loaded into its own memory, the binary scanning application 345 can scan the contents of the image, checking for any malicious code or signatures. If everything looks fine, the binary scanning application 345 logs the results and notifies the BMC firmware 130. The BMC firmware 130 can then send the log information to the host OS 194 and instruct the GPU 218 to begin the flashing process to write the binary image from the staging area 354 to the ROM 360.

Further, when the scan by the binary scanning application 345 is clean, indicating no malicious code or signatures, in one configuration, the BMC firmware 130 can initiate the flashing process directly. The BMC firmware 130 sends a sideband command to the device, such as the GPU 218, to commence the flashing operation. The device then reads the binary image from its staging area 354 in the RAM 352 and writes the binary image to its ROM 360, effectively flashing the binary image and updating its firmware or installing the application.

In another configuration, the BMC firmware 130 can send an event back to the host OS 194, indicating that the scan was successful and the binary image is clean. Upon receiving this event, the host OS 194 can initiate the flashing process by sending an instruction to the device, such as the GPU 218, to start the flashing operation. The device then reads the binary image from its staging area 354 in the RAM 352 and writes the binary image to its ROM 360, updating its firmware or installing the On the other hand, if the binary scanning application 345 finds any malicious code or signatures in the binary image, it notifies the BMC firmware 130, which in turn informs the host OS 194 that the image is compromised. In this case, the flashing process is not initiated, and the host OS 194 or the BMC firmware 130 can delete the compromised image from the staging area 354 by overwriting the memory space with zeros, effectively flushing out the memory.

Figure 4:
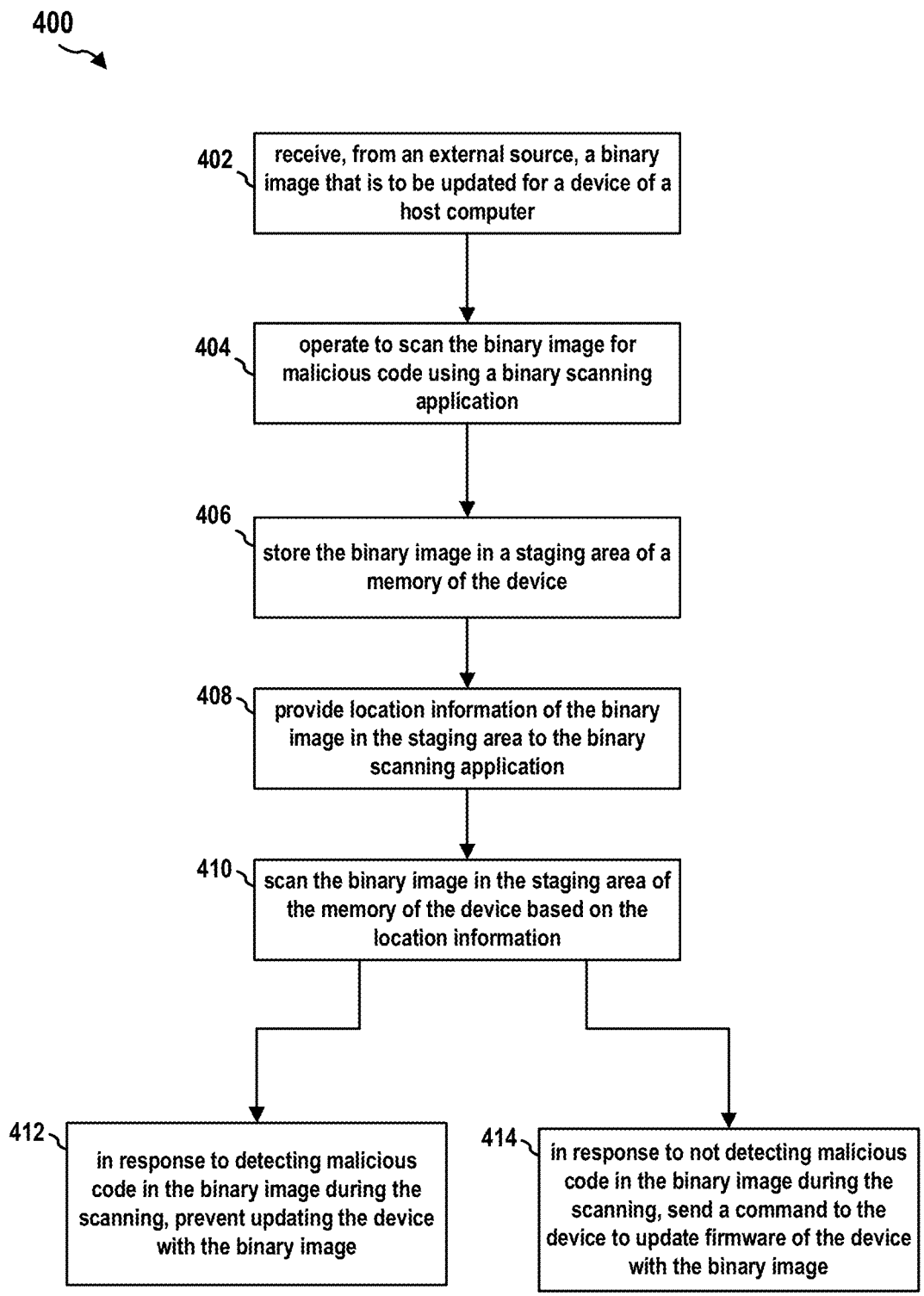
FIG. 4 is a flow chart of a first method (process) for scanning a binary image to detect malicious code before updating a device of a host computer.

FIG. 4 is a flow chart 400 of a first method (process) for scanning a binary image to detect malicious code before updating a device of a host computer. The method may be performed by a BMC (e.g., the BMC 102).

In operation 402, the BMC receives, from an external source, a binary image that is to be updated for a device of a host computer. The binary image may comprise a firmware image for the device and/or an application executable on the device. The device may be any one of a network interface controller (NIC), a redundant array of independent disks (RAID) controller, a field-programmable gate array (FPGA), and a graphics processing unit (GPU).

In operation 404, the BMC operates to scan the binary image for malicious code using a binary scanning application. The binary scanning application may comprise a utility that matches malware signatures to contents of the binary image.

In operation 406, to scan the binary image, the BMC stores the binary image in a staging area of a memory of the device. In operation 408, the BMC provides location information of the binary image in the staging area to the binary scanning application. In operation 410, the binary scanning application scans the binary image in the staging area of the memory of the device based on the location information.

In certain configurations, to scan the binary image, the BMC loads the binary scanning application from a storage of the BMC into a memory of the BMC. The BMC then executes, using a processor of the BMC, the binary scanning application to scan the binary image stored in the staging area of the memory of the device.

In certain configurations, to scan the binary image, the BMC loads the binary scanning application from a storage of the BMC into a field-programmable gate array (FPGA) of the BMC. The FPGA then executes the binary scanning application to scan the binary image stored in the staging area of the memory of the device.

In operation 412, in response to detecting malicious code in the binary image during the scanning, the BMC prevents updating the device with the binary image.

In operation 414, in response to not detecting malicious code in the binary image during the scanning, the BMC sends a command to the device to update firmware of the device with the binary image.

Figure 5:
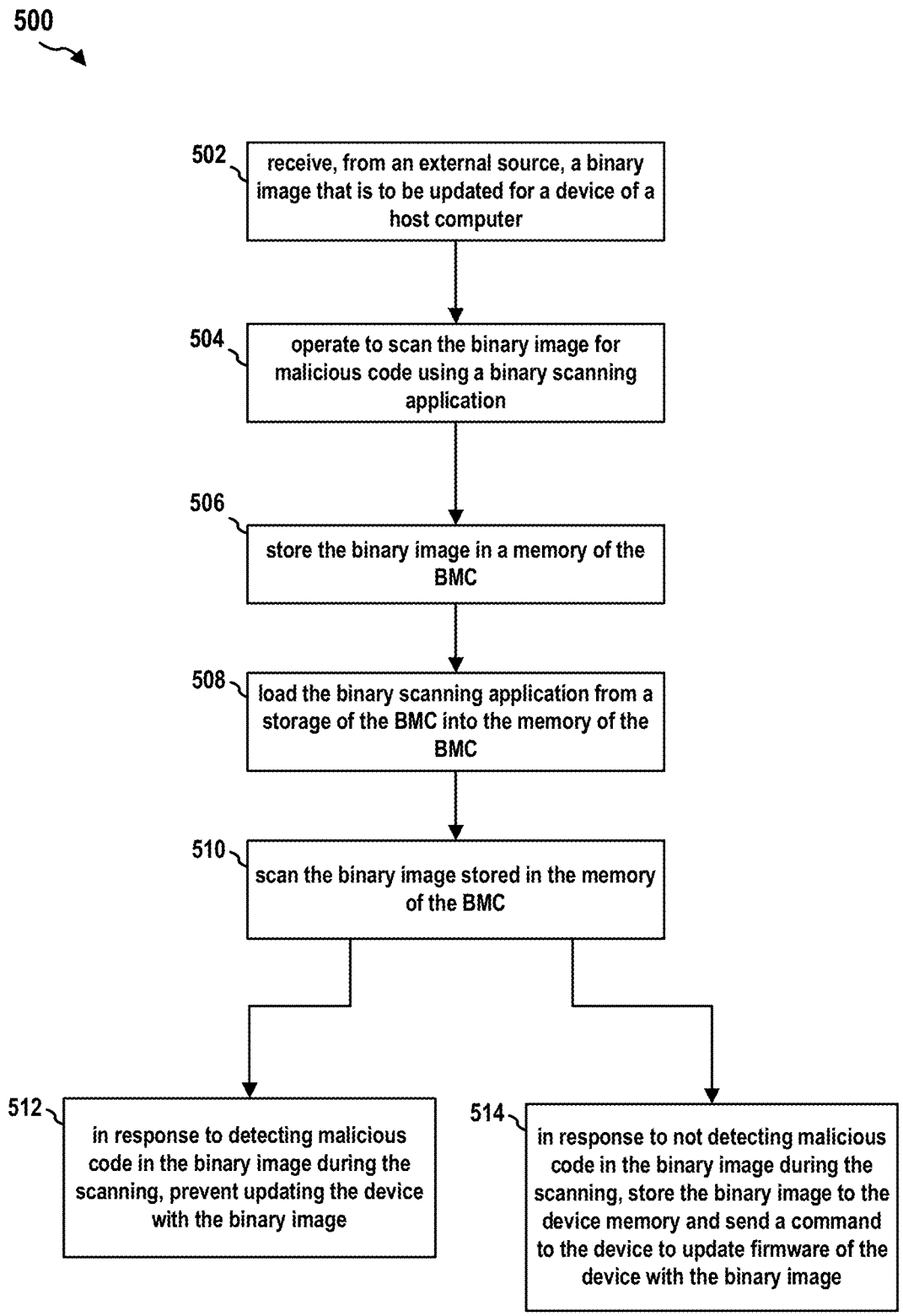
FIG. 5 is a flow chart of a second method (process) for scanning a binary image to detect malicious code before updating a device of a host computer.

FIG. 5 is a flow chart 500 of a second method (process) for scanning a binary image to detect malicious code before updating a device of a host computer. The method may be performed by a BMC (e.g., the BMC 102).

In operation 502, the BMC receives, from an external source, a binary image that is to be updated for a device of a host computer. The binary image may comprise a firmware image for the device and/or an application executable on the device. The device may be any one of a network interface controller (NIC), a redundant array of independent disks (RAID) controller, a field-programmable gate array (FPGA), and a graphics processing unit (GPU).

In operation 504, the BMC operates to scan the binary image for malicious code using a binary scanning application. The binary scanning application may comprise a utility that matches malware signatures to contents of the binary image.

In operation 506, to scan the binary image, the BMC stores the binary image in a memory of the BMC. In operation 508, the BMC loads the binary scanning application from a storage of the BMC into the memory of the BMC. In operation 510, the BMC executes, using a processor of the BMC, the binary scanning application to scan the binary image stored in the memory of the BMC.

In operation 512, in response to detecting malicious code in the binary image during the scanning, the BMC prevents updating the device with the binary image.

In operation 514, in response to not detecting malicious code in the binary image during the scanning, the BMC stores the binary image to the device memory and sends a command to the device to update firmware of the device with the binary image.

Figure 6:
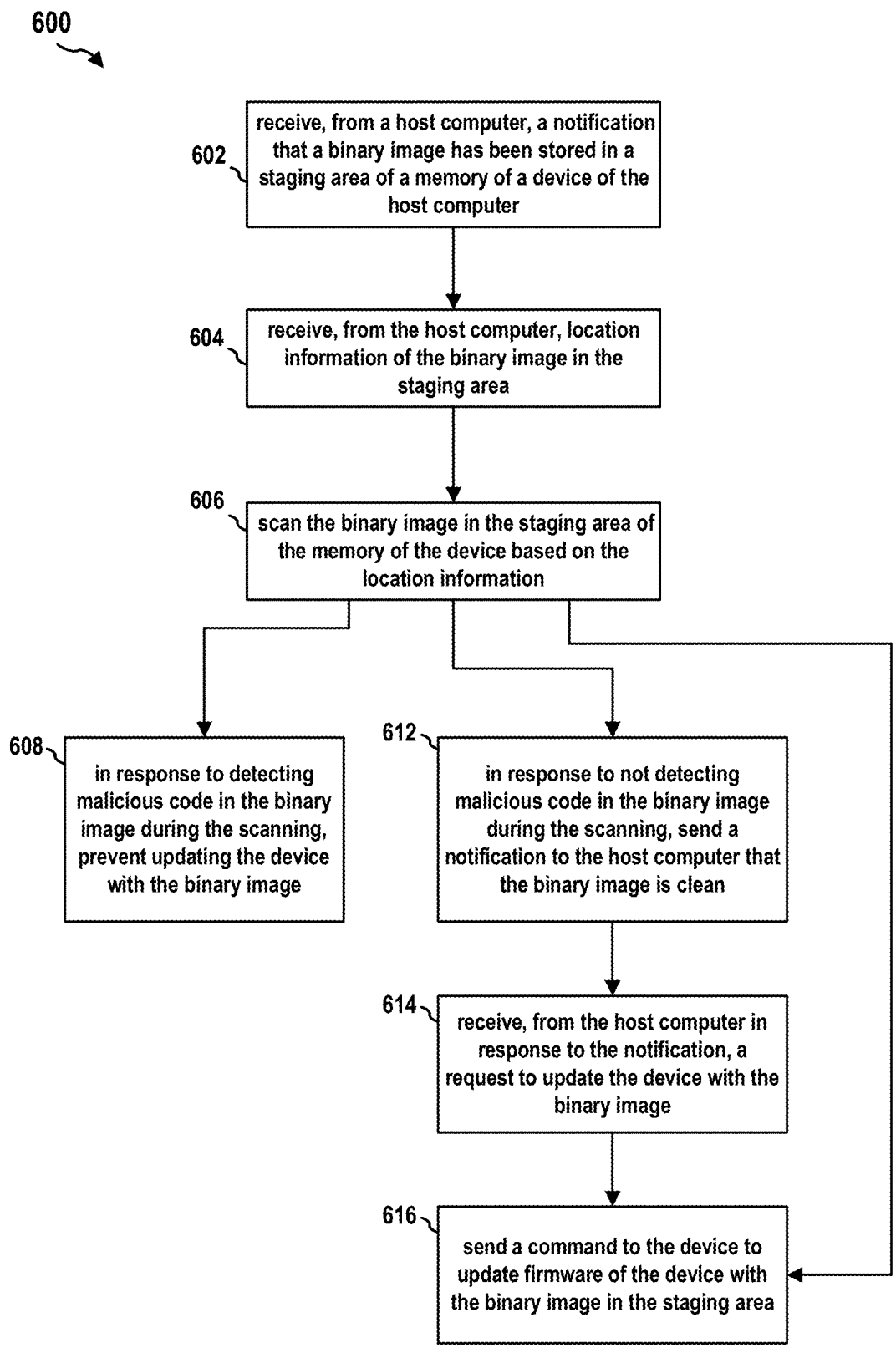
FIG. 6 is a flow chart of a third method (process) for scanning a binary image to detect malicious code before updating a device of a host computer.

FIG. 6 is a flow chart 600 of a third method (process) for scanning a binary image to detect malicious code before updating a device of a host computer. The method may be performed by a BMC (e.g., the BMC 102).

In operation 602, the BMC receives, from a host computer, a notification that a binary image has been stored in a staging area of a memory of a device of the host computer. The binary image is for updating firmware of the device. The device may be any one of a network interface controller (NIC), a redundant array of independent disks (RAID) controller, a field-programmable gate array (FPGA), and a graphics processing unit (GPU). The binary image may comprise at least one of a firmware image for the device and an application executable on the device.

In operation 604, the BMC receives, from the host computer, location information of the binary image in the staging area.

In operation 606, the binary scanning application scans the binary image in the staging area of the memory of the device based on the location information. The binary scanning application may comprise a utility that matches malware signatures to contents of the binary image.

In operation 608, in response to detecting malicious code in the binary image during the scanning, the BMC prevents updating the device with the binary image.

In certain configurations, in operation 612, in response to not detecting malicious code in the binary image during the scanning, the BMC sends a notification to the host computer that the binary image is clean. In operation 614, the BMC receives, from the host computer in response to the notification, a request to update the device with the binary image. In operation 616, the BMC sends a command to the device to update firmware of the device with the binary image in the staging area.

In certain configurations, in response to not detecting malicious code in the binary image during the scanning, the BMC directly enters into operation 616 and sends a command from the BMC to the device to update firmware of the device with the binary image in the staging area.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operation of a baseboard management controller (BMC), comprising:
   determining, by the BMC, that a binary image for a device of a host computer is to be updated;
   storing, in a non-volatile storage of the BMC, a binary scanning application and malware signatures;
   identifying, by the BMC, that the binary image is stored in a staging area of a random access memory (RAM) of the device;
   scanning, by the BMC using the binary scanning application, content of the binary image for malicious code by accessing the staging area of the RAM of the device via a Peripheral Component Interconnect Express (PCIe) interface to match the content of the binary image against the malware signatures, wherein the scanning is performed even when a cryptographic signature of the binary image is verified; and
   in response to detecting malicious code in the binary image during the scanning, preventing updating the device with the binary image.

2. The method of claim 1, wherein the determining that a binary image for a device of a host computer is to be updated further comprises:
   receiving, at the BMC, the binary image from an external source.

3. The method of claim 2, further comprising:
   storing, by the BMC, the binary image in the staging area of the RAM of the device; and
   providing, by the BMC, location information of the binary image in the staging area to the binary scanning application.

4. The method of claim 3, wherein the scanning the binary image further comprises:
   loading, by the BMC, the binary scanning application from a storage of the BMC into a memory of the BMC; and
   executing, by a processor of the BMC, the binary scanning application to scan the binary image stored in the staging area of the memory of the device.

5. The method of claim 3, wherein the scanning the binary image further comprises:
   loading, by the BMC, the binary scanning application from a storage of the BMC into a field-programmable gate array (FPGA) of the BMC; and
   executing, by the FPGA, the binary scanning application to scan the binary image stored in the staging area of the memory of the device.

6. The method of claim 2, further comprising:
   in response to not detecting malicious code in the binary image during the scanning, sending a command from the BMC to the device to update firmware of the device with the binary image.

7. The method of claim 1, wherein the determining that a binary image for a device of a host computer is to be updated further comprises:
   receiving, at the BMC from the host computer, a notification that the binary image has been stored in a staging area of a memory of the device.

8. The method of claim 7, wherein the scanning the binary image comprises:
   receiving, at the BMC from the host computer, location information of the binary image in the staging area; and
   scanning, by the binary scanning application, the binary image in the staging area of the memory of the device based on the location information.

9. The method of claim 8, further comprising:
   in response to not detecting malicious code in the binary image during the scanning, sending a notification from the BMC to the host computer that the binary image is clean.

10. The method of claim 9, further comprising:
    receiving, at the BMC from the host computer in response to the notification, a request to update the device with the binary image; and
    sending a command from the BMC to the device to update firmware of the device with the binary image in the staging area.

11. The method of claim 8, further comprising:
    in response to not detecting malicious code in the binary image during the scanning, sending a command from the BMC to the device to update firmware of the device with the binary image in the staging area.

12. The method of claim 1, wherein the device is any one of:
    a network interface controller (NIC);
    a redundant array of independent disks (RAID) controller;
    a field-programmable gate array (FPGA); and
    a graphics processing unit (GPU).

13. The method of claim 1, wherein the binary image comprises at least one of:
    a firmware image for the device; and
    an application executable on the device.

14. A baseboard management controller (BMC) comprising:
    a processor; and
    a memory storing instructions that, when executed by the processor, cause the BMC to:
       determine that a binary image for a device of a host computer is to be updated;
       store, in a non-volatile storage of the BMC, a binary scanning application and malware signatures;
       identify that the binary image is stored in a staging area of a random access memory (RAM) of the device;
       scan, using the binary scanning application, content of the binary image for malicious code by accessing the staging area of the RAM of the device via a Peripheral Component Interconnect Express (PCIe) interface to match the content of the binary image against the malware signatures, wherein the scanning is performed even when a cryptographic signature of the binary image is verified; and
       in response to detecting malicious code in the binary image during the scanning, prevent updating the device with the binary image.

15. The BMC of claim 14, wherein the instructions to determine that a binary image for a device of a host computer is to be updated further cause the BMC to:
    receive the binary image from an external source.

16. The BMC of claim 15, wherein the instructions further cause the BMC to:
    store the binary image in the staging area of the RAM of the device; and
    provide location information of the binary image in the staging area to the binary scanning application.

17. A non-transitory computer-readable medium storing instructions which when executed by a processor of a baseboard management controller (BMC) cause the BMC to:
    determine that a binary image for a device of a host computer is to be updated;
    store, in a non-volatile storage of the BMC, a binary scanning application and malware signatures;
    identify that the binary image is stored in a staging area of a random access memory (RAM) of the device;
    scan, using the binary scanning application, content of the binary image for malicious code by accessing the staging area of the RAM of the device via a Peripheral Component Interconnect Express (PCIe) interface to match the content of the binary image against the malware signatures, wherein the scanning is performed even when a cryptographic signature of the binary image is verified; and
    in response to detecting malicious code in the binary image during the scanning, prevent updating the device with the binary image.

* * * * *